C. C. Schmitt.
Step Ladder.
Nº 52,211. Patented Jan. 23, 1866.
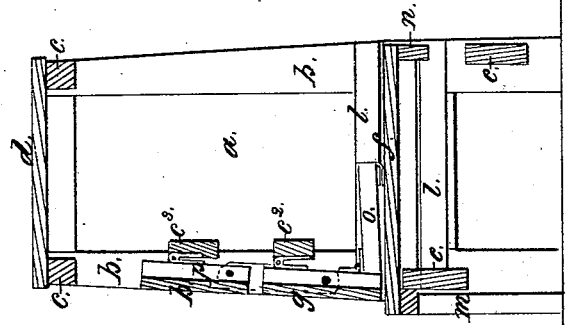
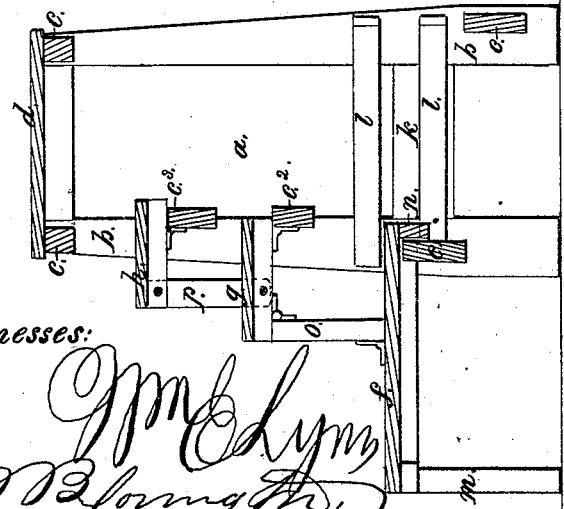
Witnesses:
Inventor:

UNITED STATES PATENT OFFICE.

CHARLES C. SCHMITT, OF NEW YORK, N. Y.

LIBRARY STEP-LADDER.

Specification forming part of Letters Patent No. 52,211, dated January 23, 1866.

*To all whom it may concern:*

Be it known that I, CHARLES C. SCHMITT, of the city, county, and State of New York, have invented a new and Improved Step-Ladder; and I do hereby declare that the following is a full, clear, and exact description thereof, which will enable those skilled in the art to make and use the same.

This invention consists in a novel arrangement, in connection with a suitable stand or frame, of a series of steps, so that when not desired to use them they can be swung or folded up in a very compact form within the said stand, and thus out of the way, such arrangement of steps being especially intended for use in private libraries, drawing-rooms, lawyers' and other offices, as well as many other places, in which a neat, convenient, and compact step-ladder is desirable.

In accompanying plate of drawings my improved library step-ladder is illustrated, Figure 1 being a transverse vertical section of the same with the steps opened; and Fig. 2 a similar section, but with the steps closed or shut up.

$a\ a$ in the drawings represent a stand or frame, consisting of four upright posts, $v$, connected together by a series of cross-ties, $c$, at their upper ends and at or near their lower ends, the frame having a board, $d$, secured to and across its top.

$f$, $g$, and $h$ are a series of steps attached and arranged together and within the frame $a$ as follows: The lower one, $f$, of the series moves and slides in and out at each end in a groove, $k$, of each end portion of the frame $a$, formed by two horizontal and parallel cleat pieces or strips, $l\ l$, attached to the frame, and has at its two outer corners supporting-legs $m\ m$. On the back edge of this step $f$ is a strip, $n$, that, as the step is drawn out, abuts against one of the cross-bars $c$ of the frame $a$, so as to prevent the step from being drawn out too far.

Arranged above the step $f$, and so as to be parallel with it when opened, and equidistant from it and each other, are the other two steps, $g$ and $h$, the first of which, $g$, is connected and supported at each of its outer corners by supports $o$ to and upon the lower steps $f$, which supports $o$ are hinged at their lower and upper ends, respectively, to the steps $f$ and $g$. The inner edge of the step $g$ is hinged to the cross-bar $c^2$ of the frame in such a manner that it will swing down, it resting by its inner edge upon such cross-bar $c^2$ when opened, as plainly seen in Fig. 1. The upper one, $h$, of the series of steps is similarly hinged at its inner edge, and supported by the cross-bar $c^3$ of the frame, suitably placed therefor to that described for the intermediate step, $g$, and is connected to the same at each end upon its outer edge by connecting-strips $p\ p$, pivoted at its upper and lower ends, respectively, to the steps $h$ and $g$, which strips $p\ p$ serve as supports to the steps $h$ when opened, as is plainly represented in the drawings.

When not desired to use the steps, by sliding the lower one, $f$, of the series into the frame moving in the guiding grooves or ways provided for it, it is obvious, from the manner in which the steps $g$ and $h$ above are connected with it through the arrangement of parts described, that they will be swung down and into a vertical position upon such side of the frame as they are arranged into the compact form and shape shown in Fig. 2, the steps thus being all incased within or by the frame $a$, entirely out of the way.

To open the steps, when so desired, it is only necessary to pull out the lower one, $f$, when the others connected with it, as explained, will be swung up into the proper position, forming a series of steps, as shown in Fig. 1, sufficiently strong and rigid for use.

The number of steps of which the step-ladder is to be composed may be increased indefinitely, and yet be susceptible of being folded up within their frame, by simply connecting them to the next below in a similar manner to that described for the upper one, $h$, of the series shown; but I deem three to be sufficient for the purposes for which my invention is especially intended, as hereinbefore stated.

The frame for the steps may be also ornamented and constructed in a variety of styles and forms, and may be with much advantage provided with a series of drawers upon its back side, and therefore I do not intend to limit myself to any particular construction or form in which it is to be made, the present invention consisting only in the peculiar manner in which the steps are connected with it and together.

What I claim as new, and desire to secure by Letters Patent, is—

The arrangement of a series of steps within any suitable frame, substantially as herein described, and so as to operate as specified.

The above specification of my invention signed by me this 7th day of November, 1865.

CHARLES C. SCHMITT.

Witnesses:
ALBERT W. BROWN,
M. M. LIVINGSTON.